United States Patent [19]

Wawra et al.

[11] Patent Number: 4,917,145

[45] Date of Patent: Apr. 17, 1990

[54] VALVE DEVICE FOR AN AERATION AND AIR EVACUATION PIPE LEADING AWAY FROM A MOTOR FUEL TANK

[75] Inventors: Helmut Wawra, Korb; Wolfgang Kleineberg, Altbach; Dieter Scheurenbrand, Wolfschlugen, all of Fed. Rep. of Germany

[73] Assignee: Daimler-Benz AG, Stuttgart, Fed. Rep. of Germany

[21] Appl. No.: 306,291

[22] Filed: Feb. 6, 1989

[30] Foreign Application Priority Data

Feb. 6, 1988 [DE] Fed. Rep. of Germany ....... 3803670

[51] Int. Cl.$^4$ ........................................... F16K 17/194
[52] U.S. Cl. ................................ 137/493; 137/527.8; 141/46; 141/59
[58] Field of Search ..................... 137/493, 587, 512.3, 137/493.1, 493.8, 527.8, 493.7, 493.6; 123/516, 518, 519; 141/44, 46, 59; 220/209, 86 UR, 86 US

[56] References Cited

U.S. PATENT DOCUMENTS

| 2,271,497 | 1/1942 | Newell ................................ 137/493 |
| 3,616,783 | 11/1971 | La Masters .......................... 123/519 |
| 4,796,593 | 1/1989 | Woodcock et al. ............. 123/516 X |

FOREIGN PATENT DOCUMENTS 7419074 10/1974 Fed. Rep. of Germany.
3719834 3/1988 Fed. Rep. of Germany.
278542 11/1970 U.S.S.R. ................................ 137/493

Primary Examiner—Stephen M. Hepperle
Attorney, Agent, or Firm—Barnes & Thornburg

[57] ABSTRACT

A valve device is disclosed for an aeration and air evacuation pipe leading away from a motor fuel tank. In a known valve device for aerating and evacuating air from a motor fuel tank, a positive pressure valve is provided, the closing force of which is generated by a compression spring which is braced against its valve element. This closing force generally corresponds to the positive pressure value of a water column of 300 to 400 mm. Such a positive pressure valve is therefore unsuitable for aeration and air evacuation devices in which the required positive pressure value is very low, only approximately 80 mm WG for example, for safety and functional considerations, and correct functioning of the valve element of the positive pressure valve is required to be ensured even at low temperatures. The positive pressure valve of the novel valve device fulfills these requirements, in that its valve seat is provided on a downward sloping end face of a duct, and the valve element is a weight component which rests upon the valve seat exclusively by the effect of gravity. By coordinating the characteristics of duct cross-sectional area and weight of the valve element, any desired closing force can be determined to close tolerances, while it is impossible for condensate to accumulate under the valve element, and therefore for the latter to freeze fast.

6 Claims, 1 Drawing Sheet

VALVE DEVICE FOR AN AERATION AND AIR EVACUATION PIPE LEADING AWAY FROM A MOTOR FUEL TANK

BACKGROUND AND SUMMARY OF THE INVENTION

The invention relates to a valve device for an aeration and air evacuation pipe of an aeration and air evacuation device arranged in an upper tank part with the pipe leading away from a motor fuel tank. The valve device has a housing which exhibits a connecting duct and an aeration and air evacuation duct, in which a negative pressure valve which opens in the case of negative pressure in the tank and a positive pressure valve which opens in the case of positive pressure in the tank are arranged between a connecting duct and the aeration and air evacuation duct, the positive pressure valve exhibiting a valve element guided raiseably and resting on a valve seat by the effect of gravity.

In the case of aeration and air evacuation devices installed in motor fuel tanks, it is necessary for the refuelling height to be limited to a definite dimension so that the aeration and air evacuation device still remains above the maximum fuel level in the fully refuelled state.

This is achieved by means of a valve device located in the aeration and air evacuation pipe outside the fuel tank, which establishes a connection of the tank interior to the atmosphere only when a positive pressure which builds up successively in the motor fuel tank during refuelling has attained a value which is greater than the pressure which results from the static height of the column of fuel required in the refuelling pipe connection to actuate the automatic cut-out device of a discharge gun. It is only in this way that the required volume of air is maintained in the fuel tank for ending the refuelling operation.

In the customary aeration and air evacuation devices an escape of motor fuel is possible through their aeration and air evacuation pipe from a specific sloping position and particularly in the inverted position of the fuel tank. For this reason the valve device of such aeration and air evacuation devices is equipped both with a positive pressure valve and a negative pressure valve and also with a safety valve. The latter exhibits a weight component which moves automatically into its closed position by the effect of gravity above a specific sloping position of the valve device. The valve element of the positive pressure valve is braced here against a compression spring which generates its closing pressure in customary manner, as the valve device according to German Utility Model 7,419,074 shows for example.

However, an aeration and air evacuation device which has already been proposed according to commonly assigned pending U.S. patent application, Ser. No. 33288, filed June 13, 1988 based, German Application P 3,719,834.3-13, is conceived so that it also assumes the function of a safety valve in a sloping or inverted position of the motor fuel tank. The valve device to be provided in its aeration and air evacuation pipe accordingly only requires to be equipped further with a positive pressure valve and a negative pressure valve. The required positive pressure value must be kept very small in this case (approximately 80 mm WG), which could only be achieved by bracing the valve element against a compression spring if a compression spring with a suitably low spring constant and a large cross-section of the valve seat were provided, which however would necessitate a great spring length. In this case it would be necessary for safety and functional considerations to ensure that no positive pressure, or none higher than that necessary to limit the level during refuelling, occurs in road service.

The invention starts here. An underlying object of the invention is to provide a valve device, the positive pressure valve of which requires no compression spring and ensures the control of a minimum pressure value with the smallest pressure deviations. It is also intended to be characterized by small dimensions, simple construction and reliable operation of its positive pressure valve, even at low temperatures.

Starting from a positive pressure valve of a valve device according to German Utility Model 7,419,074, this object is achieved according to the invention by providing an arrangement wherein a housing which exhibits a connecting duct and an aeration and air evacuation duct, in which a negative pressure valve which opens in the case of negative pressure in the tank and a positive pressure valve which opens in the case of positive pressure in the tank are arranged between a connecting duct and the aeration and air evacuation duct, the positive pressure valve exhibiting a valve element guided raiseably and resting on a valve seat by the effect of gravity.

The positive pressure of valve of the valve device according to the invention therefore operates with functional parameters which can be executed to very close tolerances in production. These functional parameters are the pressure-stressed surface, the size of which is also determined by sloping position of the valve element in its closed position, and the weight of the valve element, it being possible to determine any desired closing force to close tolerances by a corresponding coordination of the characteristic surface and weight.

The arrangement of the valve seat on a downward sloping duct end face ensures that it is impossible for condensate to accumulate within the duct, which might jam the valve element by freezing fast at low temperatures.

Since no further valve components are required apart from valve element and duct, the positive pressure valve can be designed advantageously in terms of space economy and production technology, and it is particularly suitable for aeration and air evacuation devices according to the above noted pending patent application corresponding to German application p 3,719,834.3-13.

Other objects, advantages and novel features of the present invention will become apparent from the following detailed description of the invention when considered in conjunction with the accompanying drawings.

DETAILED DESCRIPTION OF THE DRAWINGS

Figure 1:
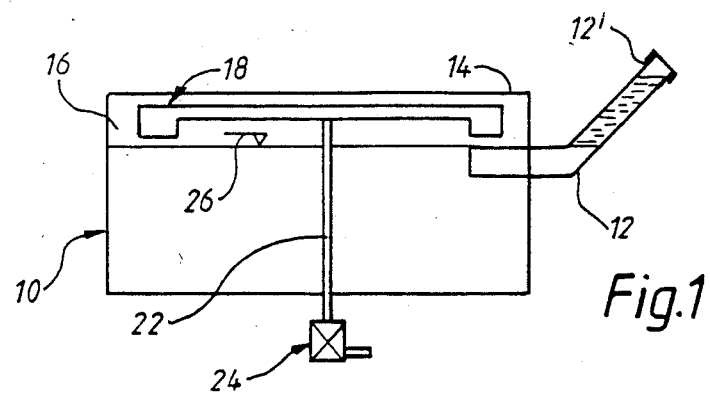
FIG. 1 shows diagrammatically a motor fuel tank equipped with an internal aeration and air evacuation device constructed according to a preferred embodiment of the invention.

A plastic tank, designated 10 in FIG. 1 can be refuelled through a filling pipe connection 12, the closable pipe connection end 12 of which is located above the top tank wall 14, for example.

The filling pipe connection 12 is connected to the motor fuel tank 10 so that there remains above its junction an upper tank interior space 16 which receives an aeration and air evacuation device 18, which is constructed so that above a specific sloping position or inverted position it prevents the escape of fuel through an aeration and air evacuation pipe 22 which leads away from it and exits from the tank base 20, for example. A valve device 24 is also interposed in pipe 22. Valve device 24 has the function of maintaining a positive pressure which builds up inside the motor fuel tank 10 during refuelling at a value which ensures that the maximum fuel level 26 is adjusted above the junction of the filling pipe connection 12 and below the aeration and air evacuation device 18.

For this purpose it is necessary for the closing force which is to be generated by the valve device 24 to be slightly greater than the positive pressure, the maximum value of which is determined by the column of fuel required in the filling pipe connection 12 to trip the automatic cut-out device of a discharge gun. Simultaneously it permits a pressure compensation in the case of a negative pressure occurring in the motor fuel tank.

This valve device 24 exhibits a housing formed by a housing lower part 28 and a housing uPper part 30. The housing uPper part 30 is equipped with a connecting duct 32 which extends within the housing 28, 30 into proximity of a housing insert 34, clamped between the two housing parts 28 and 30, for example. The housing lower part is equipped with an aeration and air evacuation duct 36 which is preferably connected to an active charcoal filter (not shown) connected to an admission pipe of an internal-combustion engine.

A connecting pipe connection 38 leads from the housing insert 34 into the housing lower part 28, which exhibits a duct having a vertically oriented duct section 40 and, adjoining the latter, a duct section 42 extending away sloping downwards. The section of the connecting pipe section 38 which contains the latter duct section 42 is constructed sloping downwards at its free end face, said end face simultaneously forming a valve seat 44 for a valve element 46 of a positive pressure valve 48 of the valve device 24.

The valve element 46 is formed by a weight component, rectangular for example and made of steel for example, which rests by its lower flat side 50 upon the valve seat 44.

The valve element 46 is pivotable into its open position about an axis 52 located higher than and staggered laterally to the valve seat 44. In the present exemplary embodiment it exhibits for this purpose two mutually parallel bearing arms 54 and 56 which embrace laterally the vertically oriented section of the connecting pipe section 38 and are each mounted on a journal 58 or 60. The bearing recesses of the bearing arms 54 and 56 exhibit here an inside diameter which is substantially greater than the diameter of the journals so that they do not obstruct a spontaneous alignment of the valve element 46 on the valve seat 44 due to its deadweight.

The duct sections 40, 42, which extend downwards, of the intermediate duct which carries gas, and the construction of the valve seat 44 by appropriate bevelling of the free end of the connecting pipe section 38, ensure that no condensate can accumulate in the duct section 42 beneath the valve element 46, and that the latter therefore cannot freeze fast to the valve seat 44.

Figure 2:
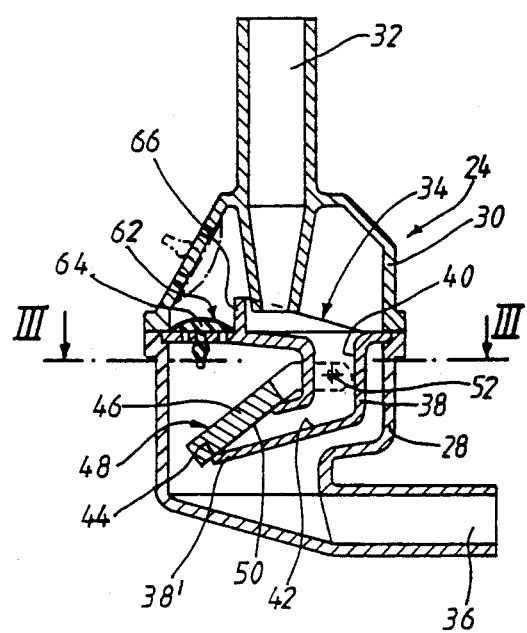
FIG. 2 shows a longitudinal section through the valve device of the aeration and air evacuation devices of FIG. 1 with the positive pressure valve being closed.
Figure 3:
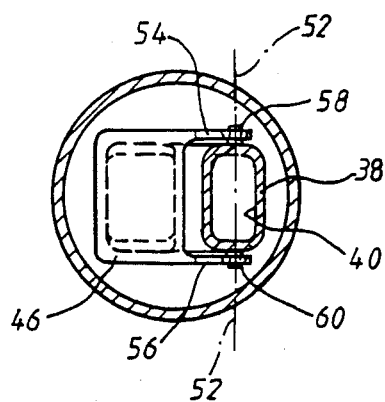
FIG. 3 shows a cross-section of the valve device taken along the line III—III of FIG. 2.

As FIG. 2, shows, the connecting pipe section 38 is formed on the housing insert 34 eccentrically to the center of the latter. There is therefore still room on the housing insert 34, in spite of its comparatively small diameter, to accommodate a negative pressure valve 62, which generally exhibits an elastomer mushroom 64. As indicated by dash-dot lines, the negative pressure valve could also be provided on the wall of the housing upper part 30.

The junction of the connecting duct 32 inside the housing is then shielded from the negative pressure valve 62 by a shield wall 66.

The positive pressure valve 48 is maintained closed by the valve element 46 due to its deadweight. By varying the cross-sectional area of the intermediate ducts 40, 42 at its junction, and the weight of the valve element 46, different closely tolerated positive pressure values corresponding to requirements can be adjusted without having to modify the entire valve. The housing parts 28 and 30 can therefore remain the same.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Valve devices for an aeration and air evacuation pipe of an aeration and air evacuation device arranged in an upper motor fuel tank part, said pipe leading away from the motor fuel tank, the valve device comprising:

a housing formed of two housing parts between which a housing insert is clamped, the housing including a connecting duct and an aeration and air evacuation duct;

an intermediate duct located between the connecting duct and the aeration and air evacuation duct, the intermediate duct having a downwardly extending duct section leading from the housing insert and a laterally and diagonally extending section which projects downwardly from the downwardly extending section;

a negative pressure valve which opens in the case of negative pressure in the tank, the negative pressure valve being located between the connecting duct and the aeration and air evacuation duct; and a positive pressure valve which opens in the case of positive pressure in the tank, the positive pressure valve being located between the connecting duct and the aeration and air evacuation duct and having a valve element guided raisably and resting on a valve seat by the effect of gravity, the valve seat being formed by a downward sloping bevelled end face of the downwardly and laterally extending section of the intermediate duct, and the valve element being a weight component which rests upon the bevelled end face of the downwardly and laterally extending section of the intermediate duct exclusively by the effect of gravity.

2. Valve device according to claim 1, wherein the weight component is pivotable into its open position about a pivot axis staggered laterally to and arranged higher than the valve seat in a normal upright position of the fuel tank.

3. Valve device according to claim 1, wherein the weight component is articulated to a substantially vertically oriented portion of the downwardly extending duct section of the intermediate duct.

4. Valve device according to claim 2, wherein the weight component is articulated to a substantially vertically oriented portion of the downwardly extending duct section of the intermediate duct.

5. Valve device according to claim 3, wherein the housing insert is penetrated by at least one aperture of the negative pressure valve.

6. Valve device according to claim 4, wherein the housing insert is penetrated by at least one aperture of the negative pressure valve.

* * * * *